(12) United States Patent
Keating et al.

(10) Patent No.: US 11,960,017 B2
(45) Date of Patent: Apr. 16, 2024

(54) UPLINK BEAM CONFIGURATION

(71) Applicant: Nokia Technologies Oy, Espoo (FI)

(72) Inventors: Ryan Keating, Chicago, IL (US);
Benny Vejlgaard, Gistrup (DK);
Oana-Elena Barbu, Aalborg (DK);
Johannes Harrebek, Aalborg (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 71 days.

(21) Appl. No.: 17/368,010

(22) Filed: Jul. 6, 2021

(65) Prior Publication Data
US 2022/0011396 A1    Jan. 13, 2022

(30) Foreign Application Priority Data
Jul. 8, 2020 (FI) ..................... 20205733

(51) Int. Cl.
*H04W 72/20* (2023.01)
*G01S 5/02* (2010.01)
*H04W 64/00* (2009.01)

(52) U.S. Cl.
CPC ............ *G01S 5/0269* (2020.05); *G01S 5/021* (2013.01); *G01S 5/0284* (2013.01); *H04W 72/20* (2023.01); *H04W 64/003* (2013.01)

(58) Field of Classification Search
CPC ...... G01S 5/0269; G01S 5/021; G01S 5/0284; G01S 5/0009; G01S 5/0257;
(Continued)

(56) References Cited

U.S. PATENT DOCUMENTS

| 2018/0302888 A1 | 10/2018 | Stirling-Gallacher et al. |
| 2019/0190582 A1 | 6/2019 | Guo et al. |

(Continued)

FOREIGN PATENT DOCUMENTS

| EP | 3306337 A1 | 4/2018 |
| EP | 3644522 A1 | 4/2020 |

(Continued)

OTHER PUBLICATIONS

Extended European Search Report received for corresponding European Patent Application No. 21183604.4, dated Jan. 5, 2022, 7 pages.
(Continued)

*Primary Examiner* — Don N Vo
(74) *Attorney, Agent, or Firm* — ALSTON & BIRD LLP

(57) ABSTRACT

An apparatus, method and computer program is described comprising: receiving downlink positioning signals from each of a plurality of communication nodes of a mobile communication system at a user device of the mobile communication system, wherein each downlink positioning signal is received from a downlink beam direction for the respective communication node; determining an angle of arrival and/or a time of arrival for each of the received downlink positioning signals; and determining an uplink positioning signal beam configuration based, at least in part, on the determined angle of arrival and/or the determined time of arrival for said received downlink positioning signals.

19 Claims, 9 Drawing Sheets

(58) Field of Classification Search
CPC ........ G01S 5/0218; G01S 5/0273; G01S 5/12; G01S 2205/00; G01S 5/02; G01S 5/0268; G01S 5/0036; H04W 72/20; H04W 64/003; H04W 16/28; H04W 64/00
USPC ...................................................... 455/456.1
See application file for complete search history.

(56) References Cited

U.S. PATENT DOCUMENTS

| | | | |
|---|---|---|---|
| 2020/0100232 A1 | 3/2020 | Onggosanusi et al. | |
| 2020/0118544 A1 | 4/2020 | Lee et al. | |
| 2020/0137715 A1 | 4/2020 | Edge et al. | |
| 2020/0145090 A1 | 5/2020 | Sun et al. | |
| 2022/0256356 A1* | 8/2022 | Bao | H04B 17/318 |
| 2022/0377634 A1* | 11/2022 | Balasubramanian | H04W 36/03 |

FOREIGN PATENT DOCUMENTS

| | | |
|---|---|---|
| EP | 3648496 A1 | 5/2020 |
| WO | 2017/146766 A1 | 8/2017 |
| WO | 2017/164925 A1 | 9/2017 |
| WO | 2019/032887 A1 | 2/2019 |
| WO | 2020/006769 A1 | 1/2020 |

OTHER PUBLICATIONS

3rd Generation Partnership Project; Technical Specification Group Radio Access Network; NR; Physical layer procedures for data (Release 16), 3GPP TS 38.214, V16.0.0, Dec. 2019, pp. 1-148.

"3rd Generation Partnership Project; Technical Specification Group Radio Access Network; LTE Positioning Protocol (LPP) (Release 16)", 3GPP TS 37.355, V16.0.0, Mar. 2020, pp. 1-281.

"3rd Generation Partnership Project; Technical Specification Group Radio Access Network; NR; Radio Resource Control (RRC) protocol specification (Release 16)", 3GPP TS 38.331, V16.0.0, Mar. 2020, pp. 1-835.

"New WID: NR Positioning Support", 3GPP TSG RAN Meeting #83, RP-190752, Agenda : 9.1.1, Intel Corporation, Mar. 18-21, 2019, 6 pages.

"Introduction of NR Positioning Support", 3GPP TSG-RAN WG1 Meeting #99, R1-1913661, Ericsson, Nov. 18-22, 2019, 11 pages.

"New SID on NR Positioning Enhancements", 3GPP TSG RAN Meeting #86, RP-193237, Agenda : 9.1.1, Qualcomm Incorporated, Dec. 9-12, 2019, 4 pages.

"Summary of 7.2.10.4: PHY Procedures for Positioning Measurements", 3GPP TSG-RAN WG1 Meeting #99, R1-1913256, Agenda : 7.2.10.4, Qualcomm Incorporated, Nov. 18-22, 2019, pp. 1-31.

"Remaining Details on Phy-layer Procedures for NR Positioning", 3GPP TSG RAN WG1 #98, R1-1912976, Agenda : 7.2.10.4, Qualcomm Incorporated, Oct. 14-18, 2019, pp. 1-7.

Office action received for corresponding Finnish Patent Application No. 20205733, dated Feb. 11, 2021, 9 pages.

* cited by examiner

UPLINK BEAM CONFIGURATION

FIELD

This specification relates to beam configuration, for example to beam configuration for use in positioning algorithms.

BACKGROUND

Mobile communication systems may transmit positioning signals (e.g. uplink and downlink positioning signals) that may be used for determining the position of nodes in the communication system. There remains a need for further developments in this area.

SUMMARY

In a first aspect, this specification describes an apparatus (e.g. a user device) comprising means configured to perform: receiving downlink positioning signals from each of a plurality of communication nodes (e.g. gNBs) of a mobile communication system at a user device of the mobile communication system, wherein each downlink positioning signal is received from a downlink beam direction for the respective communication node; determining (e.g. locally at a user device) an angle of arrival and/or a time of arrival for each of the received downlink positioning signals; and determining an uplink positioning signal beam configuration based, at least in part, on the determined angle of arrival and/or the determined time of arrival for said received downlink positioning signals. The downlink positioning signals may be positioning reference signals. The uplink positioning signals may be sounding reference signals.

The apparatus may further comprise means configured to perform: transmitting uplink positioning signals from the user device to some or all of the plurality of communication nodes in accordance with the determined uplink positioning signal beam configuration.

The apparatus may be further configured to perform determining information relating to an orientation of the user device and/or user device inertial sensor measurements, wherein the uplink positioning signal beam configuration is based, at least in part, on: the determined orientation information and/or the inertial sensor measurements; and the determined time of arrival for said downlink positioning signals.

In some example embodiments, determining the angle of arrival of at least some of the downlink positioning signals is based, at least in part, on data from a plurality of panels (e.g. all panels that can received respective PRS signals) that can detect the respective downlink positioning signal. Determining the angle of arrival of at least some of the downlink positioning signals may be based, at least in part, on a relative angle of arrival between two or more of said plurality of panels.

The apparatus may further comprise means configured to perform: sampling received data at said user device, wherein the received data is based on originally transmitted downlink positioning signals, multi-path signals and noise; cross-correlating the sampled received data with the originally transmitted downlink positioning signals; initialising parameters that describe the multipath transmissions; iterating said parameters to improve estimations of said parameters until final parameter estimates are obtained; and determining an angle of arrival and a time of arrival based, at least in part, on said final parameter estimates. Some example embodiments further comprising generating a discrete version of said determined angle of arrival in accordance with a codebook, wherein said uplink positioning signal beam configuration is based, at least in part, on the discrete version of said determined angle of arrival.

In some example embodiments, the number of uplink beams or resources available for use in the uplink positioning signal beam configuration may be less than the number of communication nodes from which downlink positioning signal beams are received. As a result, the efficient selection of the uplink beam configuration may not be trivial.

The apparatus may further comprise means configured to perform sending round trip delay data for some or all of the plurality of communication nodes of the mobile communication system to a location management function of the communication system.

The downlink positioning signals may be received as beamed signals or as omnidirectional or wide beam signals. For example, in the event that the downlink positioning signals are received as beamed signals, the uplink sounding reference signal beam configuration may be determined based at least on the time of arrival, RSRP and LOS probability. In the event that the downlink positioning signals are received as omnidirectional or wide beam signals, the uplink sounding reference signal beam configuration may be determined based at least on the time of arrival and angle of arrival data.

The said means may comprise: at least one processor; and at least one memory including computer program code, the at least one memory and the computer program configured, with the at least one processor, to cause the performance of the apparatus.

In a second aspect, this specification describes a method comprising: receiving downlink positioning signals from each of a plurality of communication nodes of a mobile communication system at a user device of the mobile communication system, wherein each downlink positioning signal is received from a downlink beam direction for the respective communication node; determining an angle of arrival and/or a time of arrival for each of the received downlink positioning signals; and determining an uplink positioning signal beam configuration based, at least in part, on the determined angle of arrival and/or the determined time of arrival for said received downlink positioning signals. The downlink positioning signals may be positioning reference signals. The uplink positioning signals may be sounding reference signals.

Some example embodiment comprise: transmitting uplink positioning signals from the user device to some or all of the plurality of communication nodes in accordance with the determined uplink positioning signal beam configuration.

Some example embodiment comprise: determining information relating to an orientation of the user device and/or user device inertial sensor measurements, wherein the uplink positioning signal beam configuration is based, at least in part, on: the determined orientation information and/or the inertial sensor measurements; and the determined time of arrival for said downlink positioning signals.

In some example embodiments, determining the angle of arrival of at least some of the downlink positioning signals is based, at least in part, on data from a plurality of panels (e.g. all panels that can received respective PRS signals) that can detect the respective downlink positioning signal. Determining the angle of arrival of at least some of the downlink positioning signals may be based, at least in part, on a relative angle of arrival between two or more of said plurality of panels.

Some example embodiment comprise: sampling received data at said user device, wherein the received data is based on originally transmitted downlink positioning signals, multi-path signals and noise; cross-correlating the sampled received data with the originally transmitted downlink positioning signals; initialising parameters that describe the multipath transmissions; iterating said parameters to improve estimations of said parameters until final parameter estimates are obtained; and determining an angle of arrival and a time of arrival based, at least in part, on said final parameter estimates. Some example embodiments further comprising generating a discrete version of said determined angle of arrival in accordance with a codebook, wherein said uplink positioning signal beam configuration is based, at least in part, on the discrete version of said determined angle of arrival.

In some example embodiments, the number of uplink beams or resources available for use in the uplink positioning signal beam configuration may be less than the number of communication nodes from which downlink positioning signal beams are received. As a result, the efficient selection of the uplink beam configuration may not be trivial.

Some example embodiment comprise: sending round trip delay data for some or all of the plurality of communication nodes of the mobile communication system to a location management function of the communication system.

The downlink positioning signals may be received as beamed signals or as omnidirectional or wide beam signals. For example, in the event that the downlink positioning signals are received as beamed signals, the uplink sounding reference signal beam configuration may be determined based at least on the time of arrival, RSRP and LOS probability. In the event that the downlink positioning signals are received as omnidirectional or wide beam signals, the uplink sounding reference signal beam configuration may be determined based at least on the time of arrival and angle of arrival data.

In a third aspect, this specification describes computer-readable instructions which, when executed by computing apparatus, cause the computing apparatus to perform (at least) any method as described with reference to the second aspect.

In a fourth aspect, this specification describes a computer-readable medium (such as a non-transitory computer-readable medium) comprising program instructions stored thereon for performing (at least) any method as described with reference to the second aspect.

In a fifth aspect, this specification describes an apparatus comprising: at least one processor; and at least one memory including computer program code which, when executed by the at least one processor, causes the apparatus to perform (at least) any method as described with reference to the second aspect.

In a sixth aspect, this specification describes a computer program comprising instructions for causing an apparatus to perform at least the following: receiving downlink positioning signals from each of a plurality of communication nodes of a mobile communication system at a user device of the mobile communication system, wherein each downlink positioning signal is received from a downlink beam direction for the respective communication node; determining an angle of arrival and/or a time of arrival for each of the received downlink positioning signals; and determining an uplink positioning signal beam configuration based, at least in part, on the determined angle of arrival and/or the determined time of arrival for said received downlink positioning signals.

In a seventh aspect, this specification describes an apparatus comprising means (such as an antenna panel) for receiving downlink positioning signals from each of a plurality of communication nodes of a mobile communication system at a user device of the mobile communication system, wherein each downlink positioning signal is received from a downlink beam direction for the respective communication node; means (such as a control module or a processor) for determining an angle of arrival and/or a time of arrival for each of the received downlink positioning signals; and means (such as the control module or the processor) for determining an uplink positioning signal beam configuration based, at least in part, on the determined angle of arrival and/or the determined time of arrival for said received downlink positioning signals. The downlink positioning signals may be positioning reference signals. The uplink positioning signals may be sounding reference signals.

BRIEF DESCRIPTION OF THE DRAWINGS

Example embodiments will now be described, by way of non-limiting examples, with reference to the following schematic drawings.

DETAILED DESCRIPTION

Figure 1:
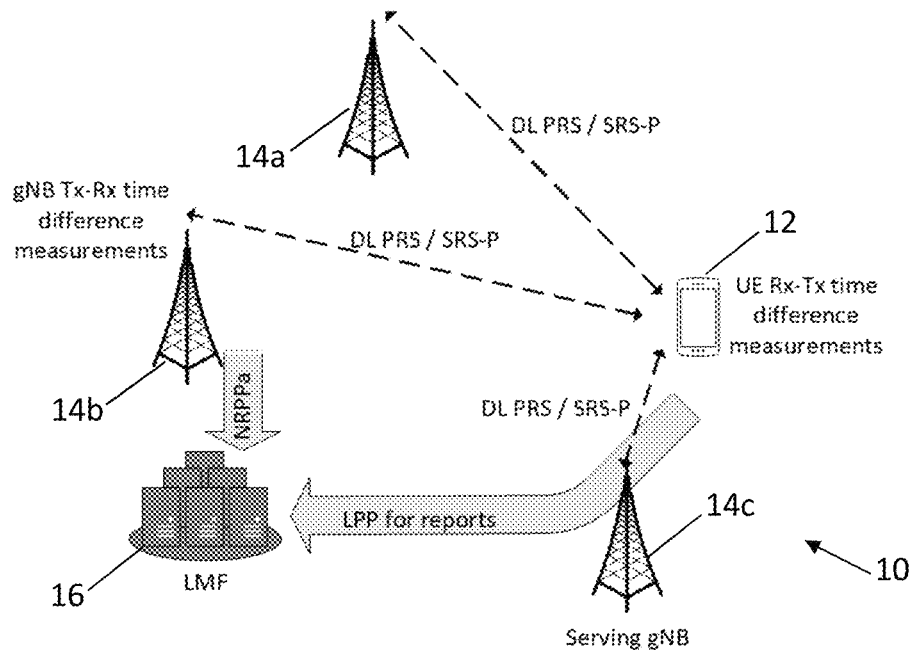
FIG. 1 is a block diagram of a system in accordance with an example embodiment.

The scope of protection sought for various embodiments of the invention is set out by the independent claims. The embodiments and features, if any, described in the specification that do not fall under the scope of the independent claims are to be interpreted as examples useful for understanding various embodiments of the invention.

In the description and drawings, like reference numerals refer to like elements throughout.

FIG. 1 is a block diagram of a system, indicated generally by the reference numeral 10, in accordance with an example embodiment. The system 10 comprises a user device 12, a first network node 14a, a second network node 14b, a third network node 14c and a location management function (LMF) 16. An LMF may be part of a core network or optionally be part of the radio access network as a location management component (LMC). The network nodes 14*a* to 14*c* form part of a mobile communication system and may from example, be base stations, such as gNBs.

The location management function 16 seeks to determine the location of the user device 12 (and other user devices) based on data received from the user device 12 and from the network nodes 14*a* to 14*c*. That information may include some or all of the following data (although the use of other data is also possible):

Downlink Time Difference of Arrival (DL-TDOA)
Uplink Time Difference of Arrival (UL-TDOA)
Downlink Angle of Departure (DL-AoD)
Uplink Angle of Arrival (UL-AoA)
Multi-cell Round Trip Time (Multi-RTT).

Positioning signals may be sent from the network nodes 14*a* to 14*c* to the user device 12 from which downlink time difference of arrival (DL-TDOA) data can be determined. Similarly, positioning signals may be sent from the user device 12 to each of the network nodes 14*a* to 14*c* from which uplink time difference of arrival (UL-TDOA) data can be determined.

As indicated in the system 10, the downlink positioning data may comprise downlink position reference signals (PRS) and the uplink positioning data may comprise sounding reference signals (SRS) for positioning (SRS-P). (It should be noted, however, that the reference signals may be any reference signals used for positioning. For example, whilst the embodiments described herein generally relate to uplink and downlink signals, the principles could be applied in other circumstances, such as sidelink signals.

Multi-cell Round Trip Time (Multi-RTT) data makes use of both uplink and downlink positioning signals and measurements. In an example Multi-RTT algorithm, the user device 12 measures the difference between transmission and reception times for data from each network node, while each network node measures the time difference between transmission and reception times for data from the user device. These time difference data are reported to the location management function (LMF) 16 which can then estimate the round-trip time (RTT) from each network node to the user device, from which the position of the user device can be estimated. The user device 12 may report measurements over the LTE Positioning Protocol (LPP) and the network nodes 14 may report measurements over New Radio Positioning Protocol A (NRPPa).

Figure 2:
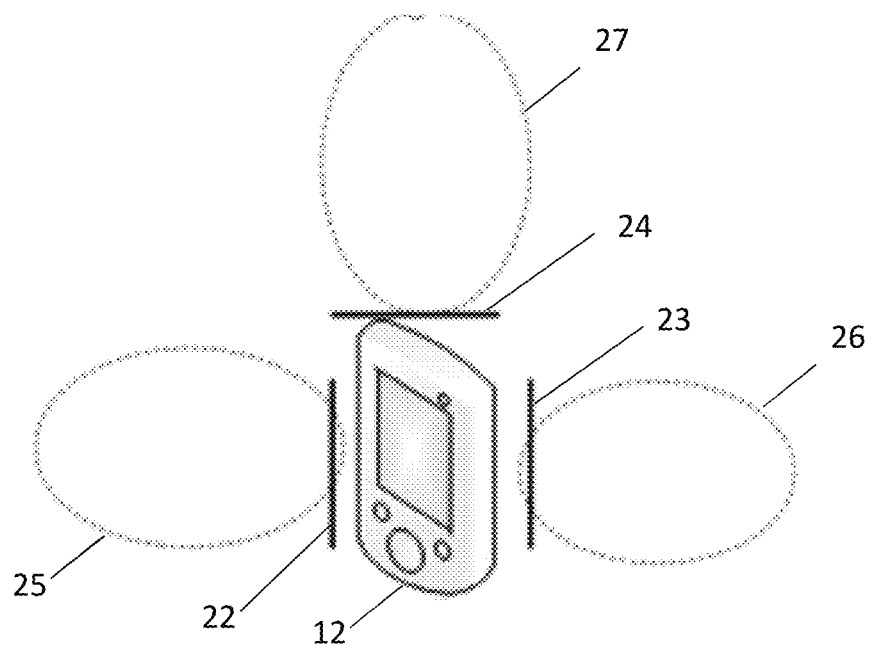
FIG. 2 is a block diagram of a user device in accordance with an example embodiment.

FIG. 2 is a block diagram of an example implementation of the user device 12 in accordance with an example embodiment.

The user device 12 has multiple antenna panels. By way of example, the user device 12 shown in FIG. 2 includes a first antenna panel 22, a second antenna panel 23 and a third antenna panel 24. Of course, any particular user device could have more or fewer than three antenna panels.

The user device 12 may, for example be used in 5G New Radio (NR) operations in which the user devices (i.e. UEs) have multiple antenna panels, but may operate under the restriction that they only have one of those antenna panels active at any particular time. This may be advantageous as it may be costly (both from a hardware complexity and energy consumption point of view) to have user devices operate with multiple simultaneously active antenna panels. For example, NR FR2 use cases (e.g. NR at 28 GHz) exist in which UEs have multiple panels (e.g. three to four antenna panels), but the principles described here are, for course, applicable to other frequency regions (e.g. FR1 and FR4).

As shown in FIG. 2, the user device 12 has three antenna panels 22, 23 and 24. Each antenna panel has a directional radiation pattern that points in different spatial directions as illustrated in FIG. 2. Thus, the first antenna panel 22 has a first radiation pattern 25, the second antenna panel 23 has a second radiation pattern 26, and the third antenna panel 24 has a third radiation pattern 27. Each antenna panel may be an antenna array, using digital, analogue, or hybrid beamforming techniques for communication with its serving cell (e.g. one of the network nodes 14*a* to 14*c*). The user device 12 may be subject to time-variant rotations, and there may be time-variant local scattering and/or blockage taking place; e.g. including a hand on a terminal that changes position. As indicated above, in some example embodiments, the user device 12 is implemented such that typically only one antenna panel is active (TX/RX) per time-instant, but other schemes, where several antenna panels can be active simultaneously in RX and/or TX are not precluded.

Figure 3:
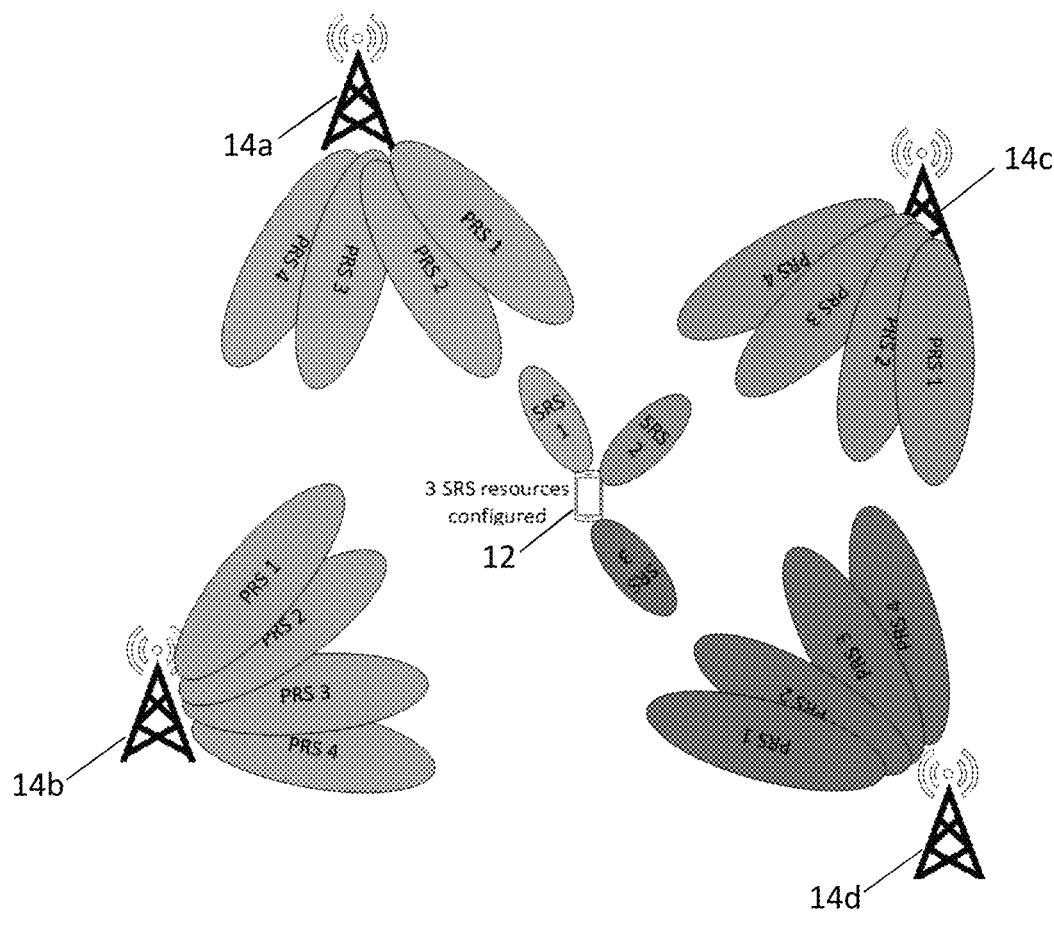
FIG. 3 is a block diagram of a system in accordance with an example embodiment.

FIG. 3 is a block diagram of a system, indicated generally by the reference numeral 30, in accordance with an example embodiment. The system 30 comprises the user device 12 and the first to third network nodes 14*a* to 14*c* described above and additionally includes a fourth network node 14*d*.

As indicated in FIG. 3, each of the network nodes 14*a* to 14*d* is able to transmit and receive data in a plurality of directions. Thus, for example, the first network node 14*a* transmits a first position reference signal (PRS1), a second position reference signal (PRS2), a third position reference signal (PRS3) and a fourth position reference signal (PRS4) in different directions (and may transmit further positioning reference signals in other directions). Similarly, the second, third and fourth network nodes 14*b* to 14*d* are each shown in FIG. 3 as transmitting first, second, third and fourth position reference signals (PRS1 to PRS4) in different directions.

In the system 30, the user device 12 is provided with three antenna panels that can receive position reference signals (PRS) and transmit sounding reference signals (SRS). In the example system 30, the user device 12 provides a first sounding reference signal (SRS1) towards the first network node 14*a*, a second sounding reference signal (SRS2) towards the third network node 14*c* and a third sounding reference signal (SRS3) towards the fourth network node 14*d*. Note that in the system 30, there are more network nodes than user device antenna panels and, with the network node configuration in the system 30, it may not be possible to provide sounding reference signals to all network nodes.

Multi-cell RTT is a positioning method that can deliver high accuracy due to lack of synchronization errors suffered and the wide bandwidth available (leading to better timing measurement accuracy). Transmissions between the user device and remote network nodes can be efficient if the spatial relationship between the user device and the respective network nodes is known. The spatial relationship is not only dependent on the relative locations of the user device and the network nodes, but is also dependent on the orientation of the user device. If multiple antenna panels are available at the user device, the relative spatial relationship may be used to determine which antenna to use for communications between a user device and a particular network node. For example, the panel providing the first sounding reference signal (SRS1) to the first network node 14*a* may not be able to send that first sounding reference to the first network node if the user device is rotated such that the respective antenna panel is directed towards the fourth network node 14d.

The spatial relationship data may also be used to determine whether beam steering may be required. Thus, the user device 12 may need to beamform uplink transmission and potentially perform transmit power control (TPC) towards neighbouring cells to overcome high pathloss.

An enhancement can be provided to SRS-P using a parameter (referred to herein as spatialRelationInfo) using neighbouring cells reference signal as the reference. Spatial relations configure a particular user device to select the RX beam used for receiving the reference signal (e.g. PRS) as the TX beam of the SRS-P. This enables the user device to perform uplink beamforming towards neighbouring cells for positioning purposes. So, based on receiving multiple downlink PRS beams from multiple network nodes (gNBs) 14a to 14d, the user device 12 could be configured to transmit using the best beams for multiple cells.

However, the spatialRelationInfo parameter is typically selected by a location management function (such as the LMF 16 described above) and the LMF needs prior reports of downlink PRS-RSRP from the user device 12 in order to know which resources to configure as the spatial relation. If the LMF 16 has no knowledge of which beams the user device will use, configuring the spatialRelationInfo parameter in every scenario may not be possible, for example, in the case of a first positioning fix or in the event that the user device 12 is highly mobile. In that case, the LMF 16 does not know how to configure the spatialRelationInfo parameter and it may be left up to user device implementation to decide the beams to use for transmission of SRS-P.

In addition, a relatively large number of network nodes (or cells) may be involved in multi-RTT for one user (e.g. 12-15 cells). A particular user device 12 may only be configured with enough SRS-P resources to transmit towards a subset of the cells involved in multi-RTT. The user device 12 may also only have a limited capability for the number of SRS-P resources per SRS-P resource set. By way of example, the system 30 where more network nodes than the number of available SRS-P resources. As discussed further below, it may be possible to select the beams in the uplink for multi-RTT in order to achieve the highest accuracy possible when not configured with spatialRelationInfo (e.g. by determining, at the user device, the optimum transmission configuration).

Figure 4:
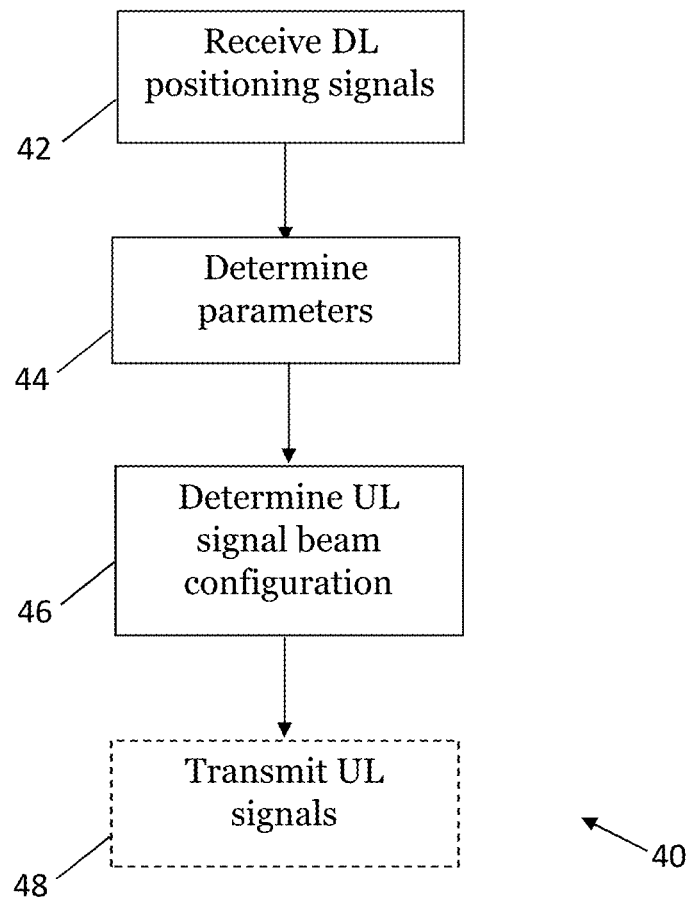
FIG. 4 is a flow chart showing an algorithm in accordance with an example embodiment.

FIG. 4 is a flow chart showing an algorithm, indicated generally by the reference numeral 40, in accordance with an example embodiment.

The algorithm 40 starts at operation 42, where downlink positioning signals are received from each of a plurality of communication nodes of a mobile communication system (such as the network nodes 14a to 14d) at a user device of the mobile communication system (such as the user device 12). Each downlink positioning signal is received from a downlink beam direction for the respective communication node.

At operation 44, parameters of the downlink beams are determined. Parameters that may be determined include an angle of arrival and/or a time of arrival for each of the received downlink positioning signals.

At operation 46, an uplink positioning signal beam configuration is determined based, at least in part, on at least some of the parameters determined in the operation 44.

If uplink positioning signals are to be transmitted, then, in operation 48, said uplink positioning signals are transmitted from the user device to some or all of the plurality of communication nodes in accordance with the uplink positioning signal beam configuration determined in operation 46.

Figure 5:
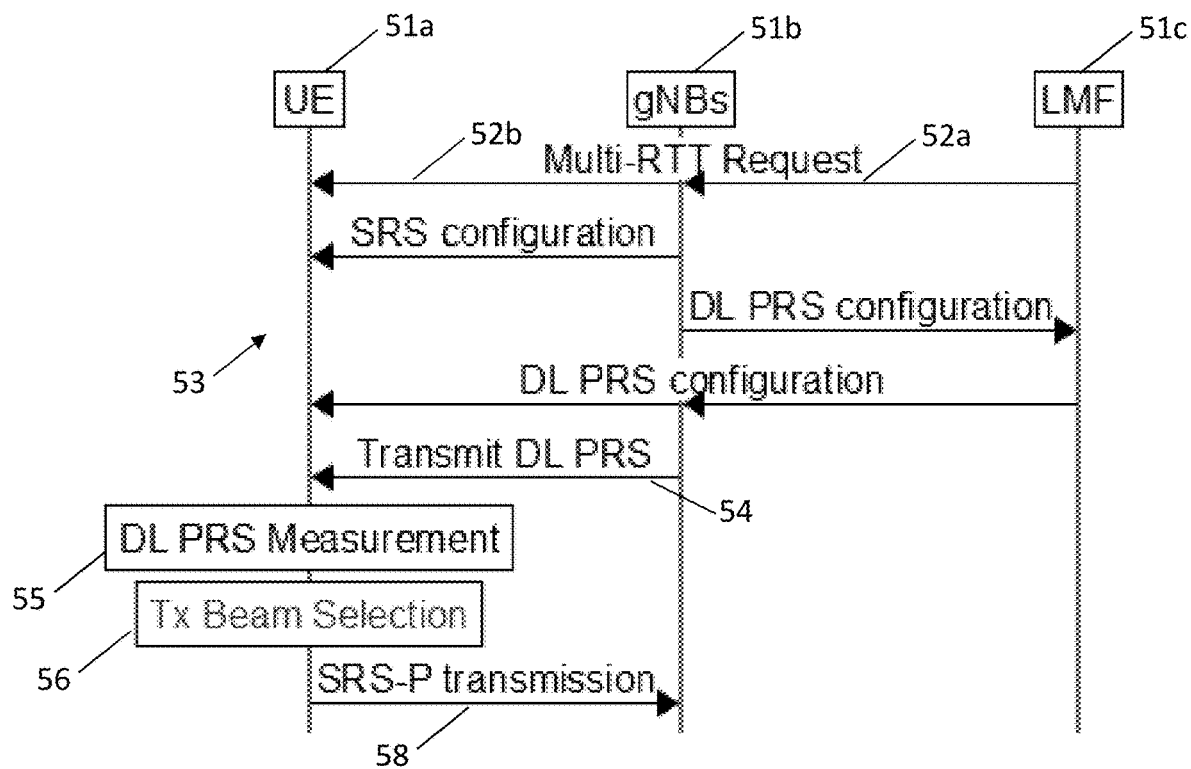
FIG. 5 shows a message sequence in accordance with an example embodiment.

FIG. 5 shows a message sequence, indicated generally by the reference numeral 50, in accordance with an example embodiment. The message sequence 50 is an example implementation of the algorithm 40 described above. The message sequence 50 shows messages being sent between a user device 51a, one or more gNBs 51b and a location management function 51c (such as the user device 12, network nodes 14a-14d and LMF 16 described above).

The message sequence 50 starts with a multi-round trip time (RTT) request being issued by the LMF 51c. The multi-RTT request takes the form of a message 52a being sent from the LMF 51c to the gNBs 51b and a message 52b being sent from the gNBs to the UE 51a.

In response to the multi-RTT request, a series of configuration messages, indicated generally by the reference numeral 53 are sent between the LMF, gNBs and UE. As shown in the message sequence 50, the configuration messages 53 may include an SRS configuration message and a number of downlink PRS configuration messages.

With the system configured, downlink PRS signals are sent from the gNBs 51b to the UE 51a, as indicated by the reference numeral 54. The PRS signals are received at the UE 51a, thereby implementing operation 42 of the algorithm 40.

On receipt of the downlink PRS signals, the UE 51a performs downlink PRS measurements 55 in order to determine parameters of the downlink PRS signals (thereby implementing operation 44 of the algorithm 40) and determines an uplink signal beam configuration 56 (thereby implementing operation 46 of the algorithm 40).

With the transmit beam configuration set, the user device 51a sends a SRS-P transmission 58 in accordance with the operation 48 of the algorithm 40.

In accordance with the algorithm 40 and the message sequence 50, round trip delay data can be determined for some or all of the plurality of communication nodes (e.g. network nodes) of a mobile communication system and sent to a location management function of the communication system.

Figure 6:
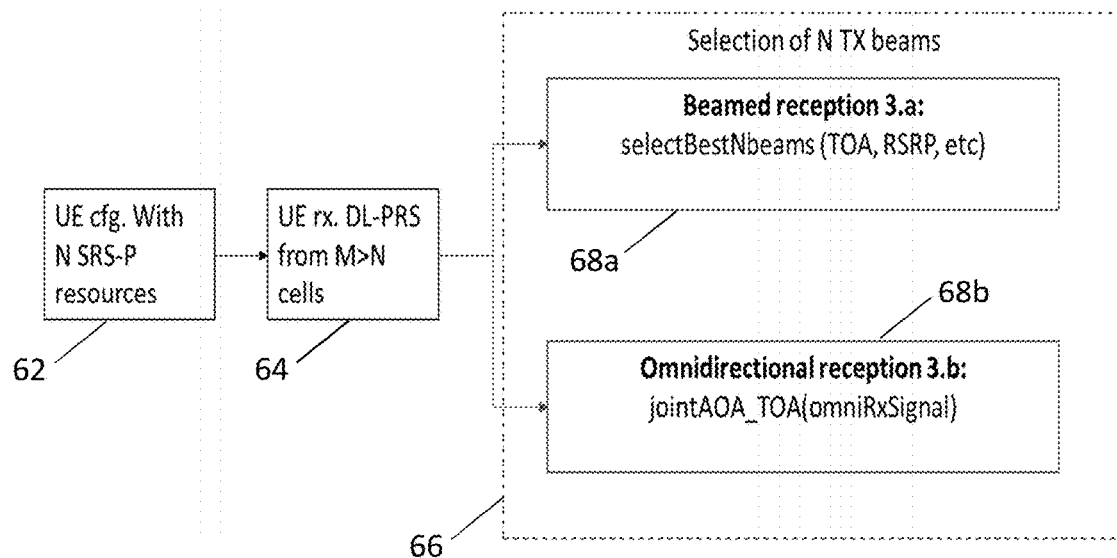
FIG. 6 is a flow chart showing an algorithm in accordance with an example embodiment.

FIG. 6 is a flow chart showing an algorithm, indicated generally by the reference numeral 60, in accordance with an example embodiment.

The algorithm 60 starts at operation 62, where a user device (such as the user device 12) is configured with N SRS-P resources (e.g. antenna panels, although the "resources" may take other forms).

At operation 64, the user device receives downlink PRS from M neighbouring cells as first step of multi-RTT.

By way of example, in the system 30, the user device has three antenna panels (such that N=3) and receives downlink PRS signals from four neighbouring cells (such that M=4).

At operation 66, the user device uses the received downlink PRS signals for the selection of N TX beams at the user device side (where M>N). As discussed further below, the operation 66 is carried out at the user device side without requiring explicit configuration of spatial relations by the relevant network. Thus, the operation 66 does not require the spatial relationship between the user devices and the network nodes to be provided to the user device. Rather, the beam selection operation 66 takes place at the user device, based on the RX beams, without requiring the spatial information data.

As indicated in the algorithm 60, the operation 66 has at least two possible implementations. If the reception of the downlink PRS signals takes the form of beamed reception, then the beam reception operation 68*a* triggered. Alternatively, if the reception of the downlink PRS signals takes the form of omnidirectional (or wide beam) reception, then the omnidirectional reception operation 68*b* is triggered.

In the beamed reception operation 68*a*, the user device uses a selectBestNbeams algorithm which uses as input one or more of: time of arrival (TOA), reference signal received power (RSRP) per beam pair, line of sight (LOS) probability, previous transmit beams, etc. to select the current N best TX beams to point the SRS-P signal towards the M>N cells.

For efficiency of the SRS-P transmission, it may be assumed that a single TX beam can be used towards multiple gNBs. The beam selection may rely on channel reciprocity and may be realized by applying thresholds on the TOA/RSRP/LOS probability, or by tracking methods that use past information about the beam selection, corroborated with link quality metrics, e.g. methods from the reinforcement learning framework, Kalman filters, etc. In one embodiment, the TOA quality metric can also be used as an input for this method which is also a novel step.

It should be noted that in beamed reception, the user device may need to turn beams on and off and select the best beam for transmission, such that RSRP data may be useful. Significant computational overheads may be required at the user device for such operations.

In the omnidirectional (or wide beam) reception operation 68*b*, the user device uses a jointAOA_TOA algorithm to compute for each detected (beamed) DL-PRS a corresponding AOA, TOA pair from a discrete set of angles from the codebook, as discussed further below. In the operation 68*b*, the user device may use the N best AOA/TOA pairs to generate transmit beamed SRS-P. In one embodiment, the TOA and AOA quality metrics can be used as additional inputs. Further details of this algorithm are provided below.

In example embodiments, a user device calculates the AoA from all panels that can detect the DL PRS. The combined AoA from multiple panels may be used to increase the accuracy of the DL detection. For some panels, the same DL PRS signal can be seen and thus combining multiple measurements will minimize any AoA measurement errors.

In one example embodiment, the goal is to obtain highest uplink beam gain and the uplink beam width may be selected based on the uncertainty of the downlink AoA estimation to ensure beam direction is aligned with a target gNB.

The algorithm 60 may be implemented in many different ways. Some example implementation features are discussed further below.

Figure 7:
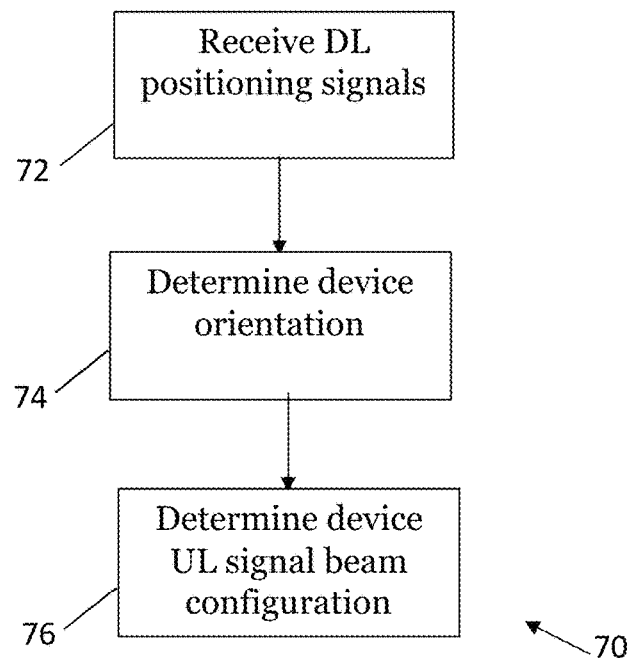
FIG. 7 is a flow chart showing an algorithm in accordance with an example embodiment.

FIG. 7 is a flow chart showing an algorithm, indicated generally by the reference numeral 70, in accordance with an example embodiment.

The algorithm 70 starts at operation 72, where downlink positioning signals are receives at a user device. The operation 72 is an example implementation of the operation 64 of the algorithm 60.

At operation 74 of the algorithm 70, information relating to user device orientation is determined. The operation 74 may be implemented using internal sensors (e.g. an inertial measurement unit (IMU)) of the user device or trajectory estimation.

At operation 76 of the algorithm 70, an uplink signal beam configuration for the user device is determined. The operation 76 may set the uplink signal beam configuration based on the user device orientation determined in the operation 74 and on other data, such as a determined time of arrival (ToA) for the downlink positioning signals (as received in the operation 72).

The operations 74 and 76 may therefore be used to implement the operation 68*a* of the algorithm 60 such that user device orientation and the the TOA quality for different downlink beams can be used, at the user device, to select the best beam per SRS-P resource. In the high mobility case, the user device may need to use the internal sensors especially if there is a gap between DL PRS reception and SRS-P transmission.

Figure 8:
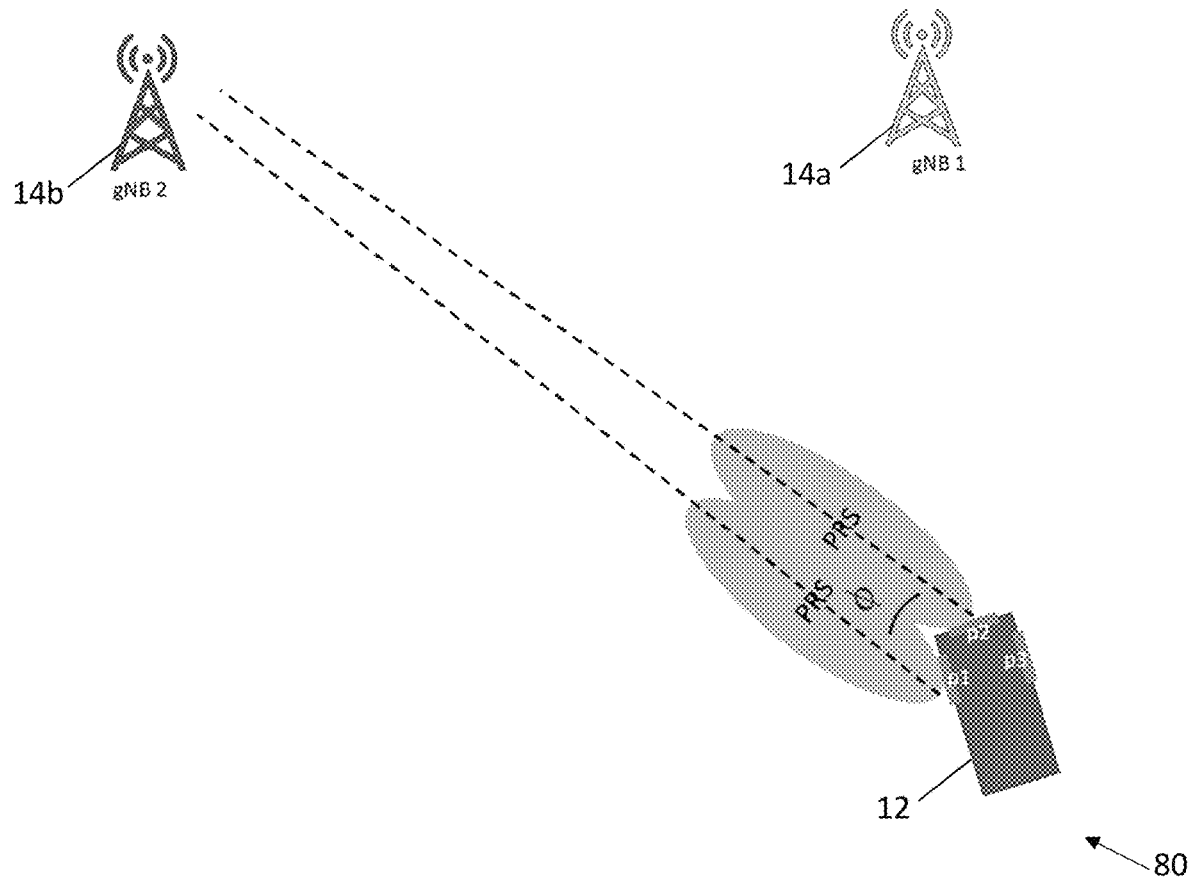
FIG. 8 is a block diagram of a system in accordance with an example embodiment.

FIG. 8 is a block diagram of a system, indicated generally by the reference numeral 80, in accordance with an example embodiment. The system 80 shows the user device 12, the first network node 14*a* and the second network node 14*b* described above.

As discussed elsewhere, the angle of arrival (AoA) of a received beam may be used in determining an uplink positioning signal beam configuration. In the system 80, the angle of arrival of a beam received from the second network node 14*b* may be based, at least in part, on data from a plurality of panels of the user device 12 that can detect the respective downlink positioning signal. For example, the angle of arrival may be determined based on a relative angle of arrival between two or more of said plurality of panels.

In the system 80, the user device 12 may calculate the AoA from all panels that can detect the downlink positioning, such as the first panel P1 and the second panel P2 that can both receive downlink PRS signals from the second network node 14*b*. The combined AoA from multiple panels will increase the accuracy of the DL detection.

The estimation of the AoA may be implemented as follows:

Panel 1 estimated AoA from network node 14*b*: $\varphi\_p1\_g2$
Panel 2 estimated AoA from network node 14*b*: $\varphi\_p2\_g2$
AoA from network node 14*b*: $\varphi\_g2$=mean ($\varphi\_p1\_g2$, $\varphi\_p2\_g2$, geometric offset between P1 and P2).

For some panels, the same downlink PRS signal can be seen and thus combining multiple measurements will minimize any AoA measurement errors based on noise averaging.

Figure 9:
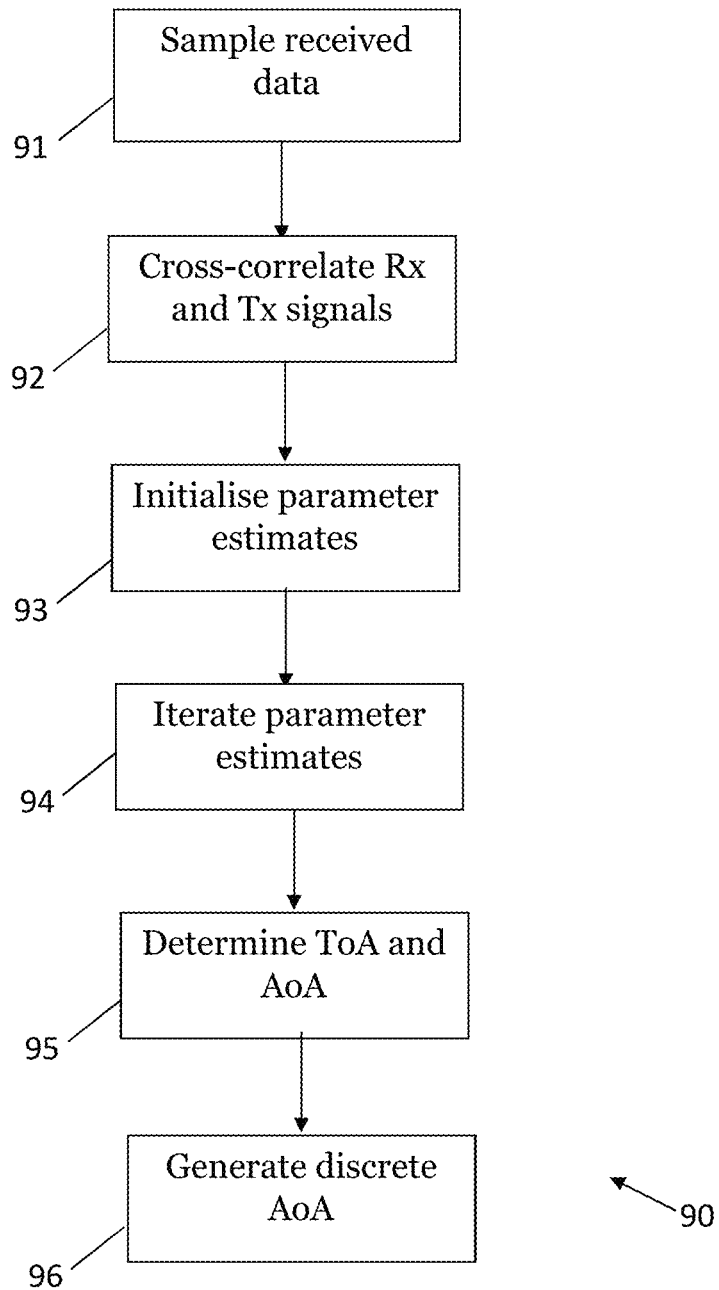
FIG. 9 is a flow chart showing an algorithm in accordance with an example embodiment.

FIG. 9 is a flow chart showing an algorithm, indicated generally by the reference numeral 90, in accordance with an example embodiment. The algorithm 90 is an example implementation of the omnidirectional reception operation 68*b* described above. As described further below, the algorithm 90 outlines a method for joint time of arrival (ToA) and (discrete) angle of arrival (AoA) determination using time-domain (TD) samples.

The algorithm 90 starts at operation 91, where received data is sampled. The received data may, for example, be received at the user device 12 from one of the network nodes 14 described above and may be based on originally transmitted downlink position signals, multi-path signals and noise.

Assume that the transmitted data is a time-domain PRS signal (including CP) transmitted in one subframe with a total length S, called s. The signal is sent over the channel with impulse response $h(\tau)=\Sigma_{l=1}^{L_p} \alpha_l \delta(\tau-\tau_l)$, where $\alpha_l$ and $\tau_l$ are the gain and delay of the l-th multipath component.

The received signal $y(t)=(h*s)(t)+n(t)=\Sigma_{l=1}^{L_p} \alpha_l s(\tau-\tau_l)+n(t)$ is sampled (in the operation 91) with rate $F_s$. The k-th sample is denoted y[k].

At operation 92, the sampled received data is cross-correlated with the originally transmitted downlink positioning signals.

Parameters that describe the multipath transmissions are initialised at operation 93 and then iterated (at operation 94) to improve estimations of said parameters until final parameter estimates are obtained. The iterations may be useful in generating improved parameter estimates since the parameters are inter-related.

The cross-correlation of operation 92 may be defined by:

$$R[d] = \sum_{k=d}^{d+S-1} y[k]s^*[k-d] = \sum_{l=1}^{L} \alpha_l \gamma(d-d_i) + w[d],$$

Where $d_i = [\tau_i F_s]$, $F_s$ is the sampling frequency and $\gamma(d)$ is the time-domain autocorrelation function (ACF) of s. We recast the received signal as:

$$r = \Gamma \alpha + w \quad (A)$$

Where $$r = [R(1), \ldots, R(D)]^T$$

$$\Gamma = \begin{bmatrix} \gamma(1-d_1) & \cdots & \gamma(1-d_L) \\ \vdots & \ddots & \vdots \\ \gamma(D-d_1) & \cdots & \gamma(D-d_L) \end{bmatrix}$$

$$a = [\alpha_1, \ldots, \alpha_L]^T$$

We can approximate the noise as $w \propto CN(0, \lambda^{-1} I_D)$, $p(r|\alpha, w) \propto CN(\Gamma\alpha, \lambda^{-1} I_D)$ and $\alpha$ is a sparse vector of length L, with at most $K \ll L$ non zero elements. We assume $p(\alpha_l|\eta_l) \propto CN(0, \eta_l^{-1})$ and $p(\eta_l) \propto Ga(a, b)$ and define the diagonal matrix $H = diag(\eta)$.

In the operation 93, the following parameters are derived by mean-field approximation:

$$\mu_\alpha = \hat{\lambda} \sum_\alpha \Gamma^H r \quad (1)$$

$$\sum_\alpha = (\hat{\lambda} \Gamma^H \Gamma + \hat{H})^{-1} \quad (2)$$

$$\hat{\eta}_l = \frac{a+1}{b + \overline{|\alpha_l|^2}} \quad (3)$$

$$\hat{\lambda} = \frac{D}{\|\overline{r - \Gamma\alpha}\|_2^2} \quad (4)$$

At operation 95, an angle of arrival and a time of arrival are determined based, at least in part, on said final parameter estimates generated in the operation 94.

Finally, at operation 96, a discrete version of the determined angle of arrival in accordance with a codebook may be generated, wherein said uplink positioning signal beam configuration is based, at least in part, on the discrete version of said determined angle of arrival. Note that the operation 96 may be omitted in some example embodiments.

The following routine may be used to implement some of the operations of the algorithm 90 to compute AOA and TOA estimates:

```
jointAOA_TOA( )
% iterative algorithm
Init a, b, λ̂, η̂
For iter = 1:MaxIter do:
    update (2)
    update (1)
    update (3)
```

```
    update (4)
Endfor
% find AOA from codebook
```

$$\phi_t = \tan\left(\frac{Im(\mu_\alpha)}{Re(\mu_\alpha)}\right) \quad (5)$$

$$\hat{\phi} = \arg\min_{\phi \in Codebook} |\phi - \phi_t|^2 \quad (6)$$

```
% find AOA of dominant component
```
$\hat{\Phi}_{Dom} = \hat{\phi}_l$ for which $\overline{|\alpha_l|^2}$ is max. (7)
```
% find delay of dominant component
```
$d_{Dom}$ for which $\overline{|\alpha_l|^2}$ is max. (8)
Return $\hat{\Phi}_{Dom}$, $d_{Dom}$.

Figure 10:
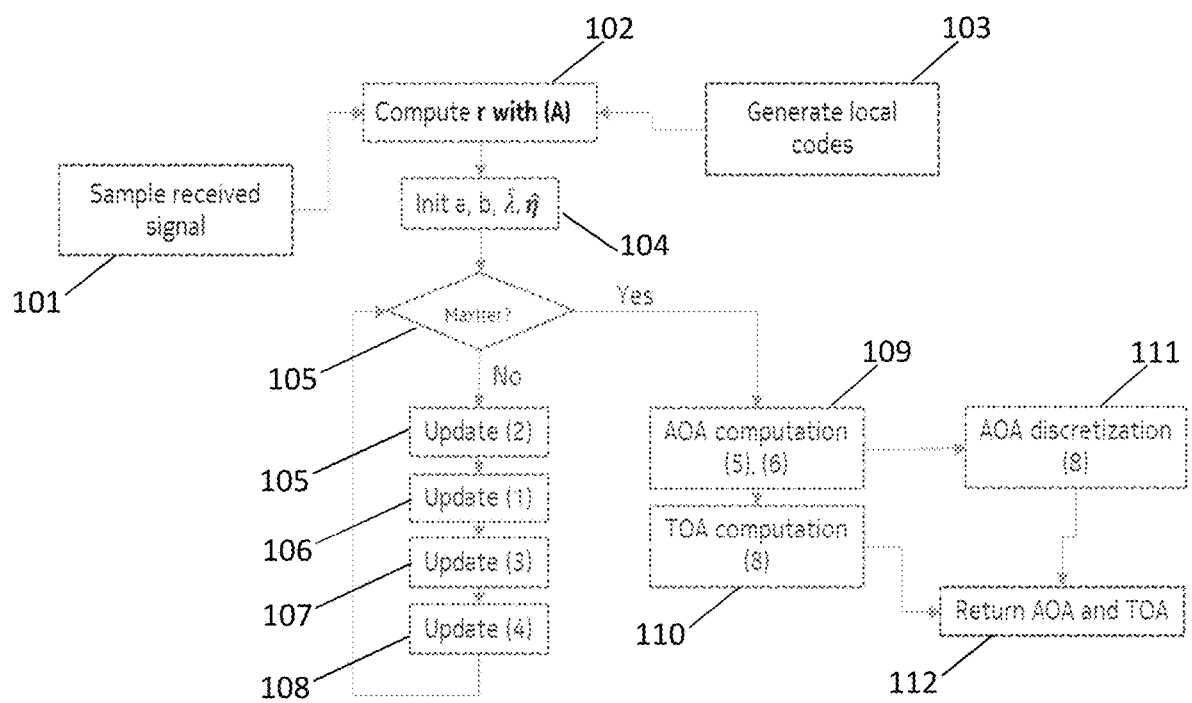
FIG. 10 is a flow chart showing an algorithm in accordance with an example embodiment.

FIG. 10 is a flow chart showing an algorithm, indicated generally by the reference numeral 100, in accordance with an example embodiment.

The algorithm 100 shows a sample being received, parameters being initialised and improved by iteration and, when the iterations are complete, the AoA and ToA outputs being generated.

The algorithm 100 starts at operation 101, where a sample signal is received (see the operation 91 described above).

At operation 101, the received signal y is recast as the variable r, based on the transmitted signal s (which is generated locally based on a known sequence ID, as received from module 103)—see the equation A discussed above and operation 92 of the algorithm 90.

The various parameters discussed above are initialised at the operation 104 (see operation 93 above) and then those parameters are updated in various iterations of the operations 105 to 108 (updating the equation 1 to 4 discussed above—in the specification example algorithm 100, those equations are updated in the order 2, 1, 3, 4), thereby implementing the operation 94.

When the operation 105 determines that a maximum number of iterations has been completed (or some other performance metric indicates that the parameters have been sufficiently updated), then the algorithm moves to operation 109, where an angle of arrival (AoA) estimate is determined based on the iterative parameters and the operation 110, where a time of arrival (ToA) is determined based on those parameters (thereby implementing the operation 95).

As discussed above, the AoA estimate may be discretised (operation 111) and the algorithm 100 ends at operation 112 where the calculated AoA and ToA data are returned.

Figure 11:
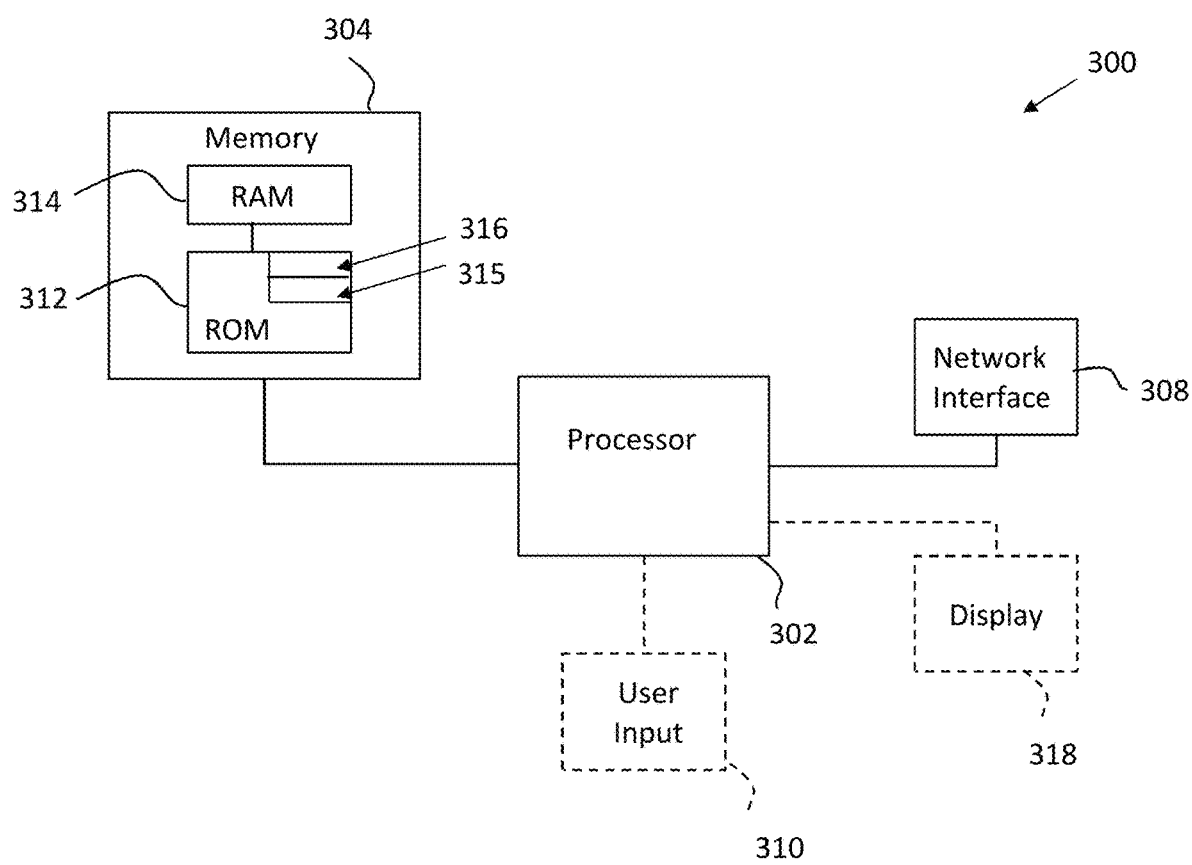
FIG. 11 is a block diagram of components of a system in accordance with an example embodiment.

For completeness, FIG. 11 is a schematic diagram of components of one or more of the example embodiments described previously, which hereafter are referred to generically as a processing system 300. The processing system 300 may, for example, be the apparatus referred to in the claims below.

The processing system 300 may have a processor 302, a memory 304 closely coupled to the processor and comprised of a RAM 314 and a ROM 312, and, optionally, a user input 310 and a display 318. The processing system 300 may comprise one or more network/apparatus interfaces 308 for connection to a network/apparatus, e.g. a modem which may be wired or wireless. The network/apparatus interface 308 may also operate as a connection to other apparatus such as device/apparatus which is not network side apparatus. Thus, direct connection between devices/apparatus without network participation is possible.

The processor 302 is connected to each of the other components in order to control operation thereof.

The memory 304 may comprise a non-volatile memory, such as a hard disk drive (HDD) or a solid state drive (SSD).

The ROM 312 of the memory 304 stores, amongst other things, an operating system 315 and may store software applications 316. The RAM 314 of the memory 304 is used by the processor 302 for the temporary storage of data. The operating system 315 may contain code which, when executed by the processor implements aspects of the algorithms or message sequences 40, 50, 60, 70, 90 and 100 described above. Note that in the case of small device/apparatus the memory can be most suitable for small size usage i.e. not always a hard disk drive (HDD) or a solid state drive (SSD) is used.

The processor 302 may take any suitable form. For instance, it may be a microcontroller, a plurality of microcontrollers, a processor, or a plurality of processors.

The processing system 300 may be a standalone computer, a server, a console, or a network thereof. The processing system 300 and needed structural parts may be all inside device/apparatus such as IoT device/apparatus i.e. embedded to very small size.

In some example embodiments, the processing system 300 may also be associated with external software applications. These may be applications stored on a remote server device/apparatus and may run partly or exclusively on the remote server device/apparatus. These applications may be termed cloud-hosted applications. The processing system 300 may be in communication with the remote server device/apparatus in order to utilize the software application stored there.

Figure 12A:
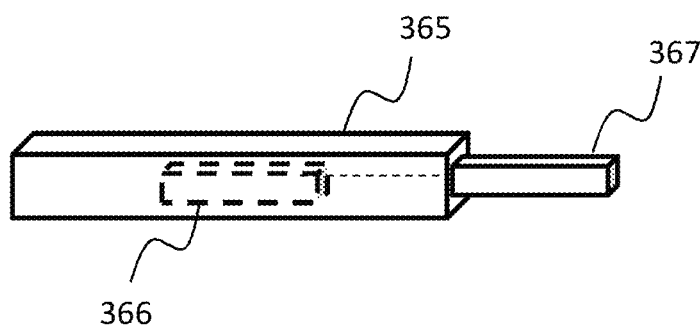
FIGS. 12A and 12B show tangible media, respectively a removable non-volatile memory unit and a company disc (CD) storing computer-readable code which when run by a computer perform operations according to example embodiment.
Figure 12B:
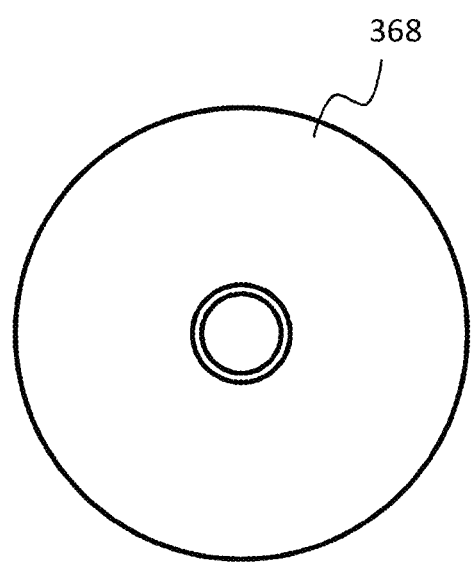

FIGS. 12A and 12B show tangible media, respectively a removable memory unit 365 and a compact disc (CD) 368, storing computer-readable code which when run by a computer may perform methods according to example embodiments described above. The removable memory unit 365 may be a memory stick, e.g. a USB memory stick, having internal memory 366 storing the computer-readable code. The internal memory 366 may be accessed by a computer system via a connector 367. The CD 368 may be a CD-ROM or a DVD or similar. Other forms of tangible storage media may be used. Tangible media can be any device/apparatus capable of storing data/information which data/information can be exchanged between devices/apparatus/network.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, "computer-readable medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices/apparatus and other devices/apparatus. References to computer program, instructions, code etc. should be understood to express software for a programmable processor firmware such as the programmable content of a hardware device/apparatus as instructions for a processor or configured or configuration settings for a fixed function device/apparatus, gate array, programmable logic device/apparatus, etc.

If desired, the different functions discussed herein may be performed in a different order and/or concurrently with each other. Furthermore, if desired, one or more of the above-described functions may be optional or may be combined. Similarly, it will also be appreciated that the flow diagrams or message sequence sequences of FIGS. 4, 5, 6, 7, 9 and 10 are examples only and that various operations depicted therein may be omitted, reordered and/or combined.

It will be appreciated that the above described example embodiments are purely illustrative and are not limiting on the scope of the invention. Other variations and modifications will be apparent to persons skilled in the art upon reading the present specification.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

Although various aspects of the invention are set out in the independent claims, other aspects of the invention comprise other combinations of features from the described example embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. An apparatus comprising at least one processor; and memory including computer program code, the memory and the computer program code configured, with the at least one processor, to cause the apparatus, when the program code is executed by the at least one processor, to perform:

receiving downlink positioning signals from respective ones of a plurality of communication nodes of a mobile communication system at a user device of the mobile communication system, wherein respective ones of the downlink positioning signals are received from a downlink beam direction for the respective communication node;

determining at least one of the following: an angle of arrival or a time of arrival for respective ones of the received downlink positioning signals;

and determining an uplink positioning signal beam configuration based, at least in part, on at least one of the following: the determined angle of arrival or the determined time of arrival, wherein a number of uplink beams or resources available for use in the uplink positioning signal beam configuration is less than a number of communication nodes from which downlink positioning signal beams are received.

2. An apparatus as claimed in claim 1, wherein the memory and the computer program code are further configured, with the at least one processor, to cause the apparatus, when the program code is executed by the at least one processor, to perform:

transmitting uplink positioning signals from the user device to some or all of the plurality of communication nodes in accordance with the determined uplink positioning signal beam configuration.

3. An apparatus as claimed in claim 1, wherein the memory and the computer program code are further configured, with the at least one processor, to cause the apparatus, when the program code is executed by the at least one processor, to perform:
determining information relating to at least one of the following: an orientation of the user device or user device inertial sensor measurements, wherein the uplink positioning signal beam configuration is based, at least in part, on:
at least one of the following: the determined orientation information or the inertial sensor measurements; and
the determined time of arrival for said downlink positioning signals.

4. An apparatus as claimed in claim 1, wherein determining the angle of arrival of at least some of the downlink positioning signals is based, at least in part, on data from a plurality of panels that can detect the respective downlink positioning signal.

5. An apparatus as claimed in claim 4, wherein determining the angle of arrival of at least some of the downlink positioning signals is based, at least in part, on a relative angle of arrival between two or more of said plurality of panels.

6. An apparatus as claimed in claim 1, wherein the memory and the computer program code are further configured, with the at least one processor, to cause the apparatus, when the program code is executed by the at least one processor, to perform:
sampling received data at said user device, wherein the received data is based on originally transmitted downlink positioning signals, multi-path signals and noise;
cross-correlating the sampled received data with the originally transmitted downlink positioning signals;
initializing parameters that describe the multipath transmissions;
iterating said parameters to improve estimations of said parameters until final parameter estimates are obtained; and
determining an angle of arrival and a time of arrival based, at least in part, on said final parameter estimates.

7. An apparatus as claimed in claim 6, wherein the memory and the computer program code are further configured, with the at least one processor, to cause the apparatus, when the program code is executed by the at least one processor, to perform:
generating a discrete version of said determined angle of arrival in accordance with a codebook, wherein said uplink positioning signal beam configuration is based, at least in part, on the discrete version of said determined angle of arrival.

8. An apparatus as claimed in claim 1, wherein the memory and the computer program code are further configured, with the at least one processor, to cause the apparatus, when the program code is executed by the at least one processor, to perform:
sending the round trip delay data for some or all of the plurality of communication nodes of the mobile communication system to the location management function of the communication system.

9. An apparatus as claimed in claim 1, wherein the downlink positioning signals are received as beamed signals or as omnidirectional or wide beam signals.

10. An apparatus as claimed in claim 9, wherein:
in the event that the downlink positioning signals are received as beamed signals, the uplink sounding reference signal beam configuration is determined based at least on the time of arrival, reference-signal-received power (RSRP) and line of sight (LOS) probability; and
in the event that the downlink positioning signals are received as omnidirectional or wide beam signals, the uplink sounding reference signal beam configuration is determined based at least on the time of arrival and angle of arrival data.

11. An apparatus as claimed in claim 1, wherein at least one of the following: the downlink positioning signals are positioning reference signals or the uplink positioning signals are sounding reference signals.

12. A method comprising:
receiving downlink positioning signals from respective ones of a plurality of communication nodes of a mobile communication system at a user device of the mobile communication system, wherein respective ones of the downlink positioning signals are received from a downlink beam direction for the respective communication node;
determining at least one of the following: an angle of arrival or a time of arrival for respective ones of the received downlink positioning signals; and
determining an uplink positioning signal beam configuration based, at least in part, on at least one of the following: the determined angle of arrival or the determined time of arrival, wherein a number of uplink beams or resources available for use in the uplink positioning signal beam configuration is less than a number of communication nodes from which downlink positioning signal beams are received.

13. A method as claimed in claim 12, further comprising:
transmitting uplink positioning signals from the user device to some or all of the plurality of communication nodes in accordance with the determined uplink positioning signal beam configuration.

14. A method as claimed in claim 12, further comprising:
determining information relating to at least one of the following: an orientation of the user device or user device inertial sensor measurements, wherein the uplink positioning signal beam configuration is based, at least in part, on:
at least one of the following: the determined orientation information or the inertial sensor measurements; and
the determined time of arrival for said downlink positioning signals.

15. A method as claimed in claim 12, wherein determining the angle of arrival of at least some of the downlink positioning signals is based, at least in part, on data from a plurality of panels that can detect the respective downlink positioning signal.

16. A method as claimed in claim 15, wherein determining the angle of arrival of at least some of the downlink positioning signals is based, at least in part, on a relative angle of arrival between two or more of said plurality of panels.

17. A method as claimed in claim 12, further comprising:
sampling received data at said user device, wherein the received data is based on originally transmitted downlink positioning signals, multi-path signals and noise;
cross-correlating the sampled received data with the originally transmitted downlink positioning signals;

initializing parameters that describe the multipath transmissions;

iterating said parameters to improve estimations of said parameters until final parameter estimates are obtained; and determining an angle of arrival and a time of arrival based, at least in part, on said final parameter estimates.

18. A method as claimed in claim 17, further comprising:

generating a discrete version of said determined angle of arrival in accordance with a codebook, wherein said uplink positioning signal beam configuration is based, at least in part, on the discrete version of said determined angle of arrival.

19. A computer program product comprising a tangible computer-readable storage medium having computer-executable program code instructions stored therein, the computer-executable program code instructions comprising program code instructions for causing an apparatus to perform at least the following:

receiving downlink positioning signals from respective ones of a plurality of communication nodes of a mobile communication system at a user device of the mobile communication system, wherein respective ones of the downlink positioning signals are received from a downlink beam direction for the respective communication node;

determining at least one of the following: an angle of arrival or a time of arrival for respective ones of the received downlink positioning signals;

and determining an uplink positioning signal beam configuration based, at least in part, on at least one of the following: the determined angle of arrival or the determined time of arrival, wherein a number of uplink beams or resources available for use in the uplink positioning signal beam configuration is less than a number of communication nodes from which downlink positioning signal beams are received.

* * * * *